April 4, 1961   R. H. W. ANNENBERG   2,978,180
ANALOGUE COMPUTERS
Filed Feb. 20, 1958
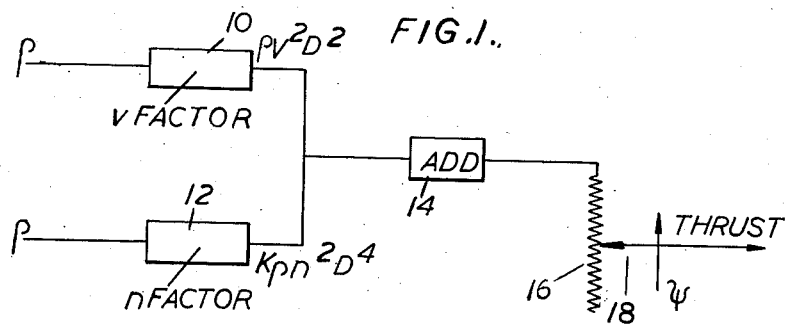
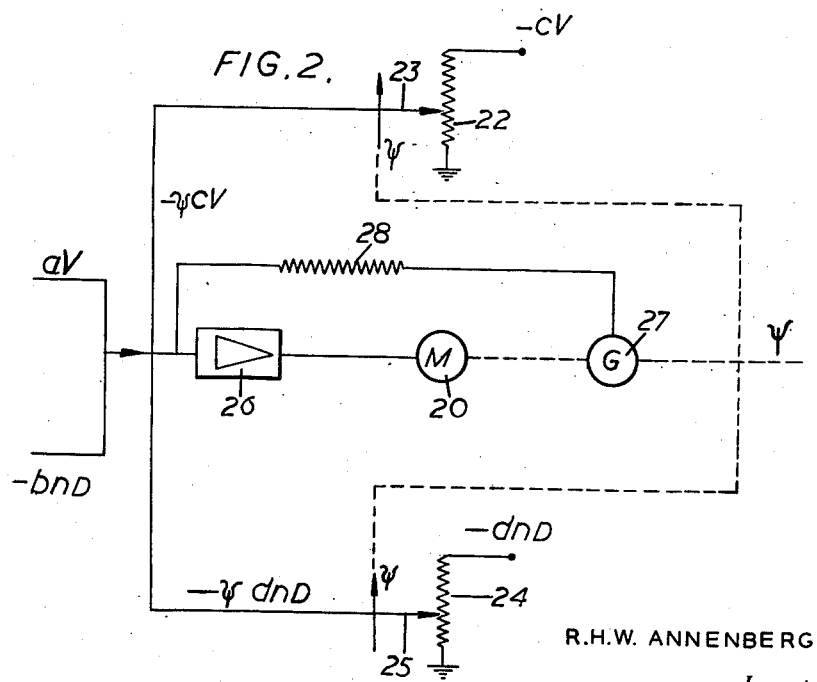
R.H.W. ANNENBERG
Inventor
By Richard L. Stephens
Attorney

United States Patent Office 2,978,180
Patented Apr. 4, 1961

2,978,180
ANALOGUE COMPUTERS

Robert Henry Watson Annenberg, Aylesbury, England, assignor to General Precision Systems Limited Filed Feb. 20, 1958, Ser. No. 747,808

Claims priority, application Great Britain Feb. 21, 1957

7 Claims. (Cl. 235—196)

This invention relates to analogue computers of the kind involving the operation of modifying a quantity in accordance with a non-dimensional parameter which is the ratio of two independent variables having the same dimensions as each other. Examples of this arise in analogue computers simulating the aerodynamics of aircraft. Commonly, the quantity to be modified is an electrical potential representing aerodynamic force and the independent variables defining the modifying parameter may be speed components whose ratio defines an entry angle, Mach number or other condition which affects the general scale on which the computer will, in practice, generate the modified force.

Such an operation is performed in two stages. The first is the computation of the required ratio by automatic evaluation of a fractional expression having one of the variables as its numerator and the other as its denominator; the second is the derivation from this result, by means of a cam or the equivalent, of a scaling factor and the application of that factor to the quantity to be modified.

It frequently happens that, within the range over which the computer is required to operate the two variables approach or even attain zero values, although not concurrently. In these circumstances, and whichever of them is adopted as the denominator, the computed ratio will have an undesirably wide range of values (which reduces accuracy of computation in analogue systems) and may rise to the completely unacceptable value of infinity. A conventional way of dealing with this difficulty is to provide means which respond automatically to the approach of this condition and, in effect, invert the quotient expression, so that it is the reciprocal of the original ratio which is then evaluated. Concurrently, of course, the cam or the equivalent referred to above must be automatically changed to one which now gives the required scaling factor as the appropriate function of this reciprocal. Such a system involves elaboration of equipment and practical difficulties in ensuring a smooth and reliable switchover between one regime and the other, especially as it normally implies that a servomotor driving the cams or the equivalent must move instantaneously from a position logging the original ratio to a position logging its reciprocal, and vice versa.

It is the object of the invention to provide a computer which solves this problem of the infinities without involving the complications of changes of regime.

According to the present invention, there is provided an analogue computer comprising means for deriving the dimensionless parameter $$\frac{x}{y}$$

by computation of the value of a fraction of the type $$\frac{ax+by}{cx+dy}$$

$x$ and $y$ being independent variables, and $a$, $b$, $c$ and $d$ being arbitrary coefficients selected with relative magnitudes such that, over the working range of the computer, while the value of the fraction is a function of $$\frac{x}{y}$$

the value of its denominator does not become or approach zero.

If the denominator of the fraction does not become zero or approach zero, the computed value of the fraction itself cannot become infinite or approach infinity. Furthermore, by appropriate selection of the constants $a$, $b$, $c$ and $d$, the range of values which the fraction can have can be restricted to that which is most desirable. The result of this is that the servo driving the cams or the equivalent by which the scaling factor is derived is not required to travel over an inordinate distance and the necessity for switching from one regime to another, as referred to above, is avoided.

The above and other features of the invention will be apparent in the following description, given by way of example, of the application of the invention to the determination of the thrust on an aircraft propeller. Reference will be had to the accompanying drawings, in which;

Figure 1 is a block diagram of apparatus for computing aircraft propeller thrust, and Figure 2 is a block diagram of apparatus for deriving input data for use in the computer of Figure 1.

The thrust of an aircraft propeller, working at fixed blade angle, can be expressed in the following alternative ways:

$$\rho V^2 D^2 f_1\left(\frac{V}{nD}\right) \qquad (1)$$

$$\rho n^2 D^4 f_2\left(\frac{V}{nD}\right) \qquad (2)$$

in which $\rho$ = air density
$V$ = true airspeed
$D$ = diameter of propeller (a constant)
$n$ = propeller rotational speed
$f_1$ and $f$ are different functions.

$V$ and $nD$ are dimensional quantities of the same kind and the parameter $$\frac{V}{nD}$$

is therefore a non-dimensional ratio of the two independent variables $V$ and $n$.

It is known that the thrust can be finite even although one or more of the terms in the expressions 1 and 2 are zero. For example, if an aircraft is gliding and there is no propeller rotation, $n$ will be zero. Consequently $$\frac{V}{nD}$$

will be infinite. As it is not possible to log infinity in a computer, the computation cannot be based on either expression 1 or 2.

Another reason why neither of these expressions can be made to serve as the basis of the computation is that if $V$ in Equation 1, or $n$ in Equation 2 is zero, then the thrust computed from that equation will be zero. This cannot be avoided even when it is known that the physically realised thrust is finite, because there are no means for multiplying a quantity of zero magnitude by a function of ($V/nD$) to produce a finite quantity.

To overcome the second of these difficulties, the expression can be rewritten:

$$(\rho V^2 D^2 + k\rho n^2 D^4) f_3 \left(\frac{V}{nD}\right) \quad (3)$$

wherein $k$ is a constant and $f_3$ is yet another function. For positive or zero values of $V$ and $n$, the term within the first bracket can never become zero except when $V$, $n$ and the physically realised thrust are simultaneously zero. Hence the multiplying factor which is a function of $(V/nD)$ is never required to be infinite.

However, in order to solve expression 3 the range of operation of the apparatus deriving $$f_3\left(\frac{V}{nD}\right)$$

would have to be infinite should $n$ approach zero because the ratio $$\frac{V}{nD}$$

would be very large. The first difficulty referred to above can be overcome by replacing the ratio $$\frac{V}{nD}$$

by the non-dimensional fraction.

$$\frac{aV - bnD}{cV + dnD} \quad (4)$$

in which $a$, $b$, $c$, $d$ are arbitrary coefficients. By suitable selection of the value of these coefficients, the value of the expression 4 can be made to have a range within chosen limits suitable to the mechanical characteristics of the computer. Furthermore, the relationship of the computed non-dimensional function to the displacement of the apparatus deriving it can, by careful selection of the constants, be made to approach linearity.

Figure 1 shows in block diagram form an arrangement for computing the thrust of an airscrew by making use of the expression $$(\rho V^2 D^2 + k\rho n^2 D^4) f_4 \left(\frac{aV - bnD}{cV + dnD}\right)$$

In what follows the fraction $$\frac{aV - bnD}{cV + dnD}$$

is represented by $\varphi$.

An input voltage representing air density ($\rho$), which is a common analogue computer quantity in the simulation of the aerodynamics of aircraft, is modified at 10 according to the true airspeed ($V$) and the airscrew diameter ($D$) to produce a voltage representing $\rho V^2 D^2$. A further input representing air density $\rho$ is modified at 12 according to airscrew diameter ($D$) and airscrew rotational speed ($n$) to produce a second voltage representing $k\rho n^2 D^4$.

True airspeed ($V$) and airscrew rotational speed ($n$) are conventional computer quantities, and multiplication by $V^2$ and $n^2$ respectively can be carried out by conventional methods. For example, multiplication of $\rho$ by $V^2$ can be achieved by energizing the winding of a potentiometer with the voltage representing $\rho$, and energizing a second potentiometer winding from the movable wiper of the first potentiometer, both the wipers of the two potentiometers being positioned by an airspeed servo. Other methods, including a more accurate method, of multiplying a potential by the square of a computer variable are set forth in the specification of United States patent application Serial No. 632,569 filed January 4, 1957 in the names of Carrol L. Duren and Edward G. Schwarm. The factors $D^2$ and $kD^4$, being constants, can be introduced in conventional manner by appropriate scaling of the potentials.

The two voltages commensurate with $\rho V^2 D^2$ and $k\rho n^2 D^4$ are added at 14, as by means of a summing amplifier, and applied to the winding of a potentiometer 16. The slider 18 of the potentiometer is operated by a servo-motor 20, (Figure 2) the shaft position of which represents the fraction $$\frac{aV - bnD}{cV + dnD}$$

The sum of the two voltages $\rho V^2 D^2 + k\rho n^2 D^4$ is thus modified by $f_4(\varphi)$, the non-dimensional function, produced as described below, to give a finite thrust output.

Figure 2 shows in block diagram form the arrangement for providing a servo-motor output shaft position representing $\varphi$.

When the motor 20 is stationary, its shaft position represents $\varphi$ and its input voltage must be zero, that is to say its input voltage is zero when $$\varphi = \frac{aV - bnD}{cV + dnD}$$

For the motor to drive, its input must be non-zero and equal to $aV - bnD - \varphi(cV + dnD)$.

As previously mentioned, true air speed ($V$) and airscrew rotational speed ($n$) are available as conventional analogue computer quantities from other parts of the apparatus, and from these voltages representing $-cV$ and $-dnD$ can be derived by appropriate scaling. In Figure 2, these two potentials are shown as applied respectively to the windings of two potentiometers 22, 24, the sliders of which are both mechanically positioned by the servo-motor 20 in accordance with the quantity $\varphi$. The potentials appearing on the potentiometer sliders 23, 25 represent $-\varphi cV$ and $-\varphi dnD$, and are fed to a summing amplifier 26. Further potentials, representing the quantities $aV$ and $-bnD$, derived by approximate scaling of the available computer quantities $V$ and $n$, are also applied to the amplifier 26.

The output of the summing amplifier 26 is therefore commensurate with $aV - bnD - \varphi(cV + dnD)$, and is employed as the input signal for driving the motor 20 to a null position representing the quantity $\varphi$. The output shaft of the servo motor 20 positions the slider 18 of the potentiometer 16 in Figure 1, as previously stated, and also drives a generator 27 affording feedback to the input of the summing amplifier 26 by way of a feedback resistor 28.

Since changes may be made in carrying out the teaching of this application without departing from the scope of the invention, it is intended that all matter contained in the above description or shown in the accompanying drawings shall be considered as illustrative only and not in a limiting sense. For example it is obvious that the invention can be practiced using either D.C. or A.C. computation techniques, and known kinds of multiplier devices other than the potentiometers described and shown may be used. Moreover, the summing amplifiers described and shown may be replaced by other equivalent summing devices, such as series summing means.

It is also to be understood that the following claims are intended to cover all of the generic and specific features of the invention described herein, and all statements of the scope of the invention which, as a matter of language, might be said to fall therein.

I claim:

1. An analogue computer for deriving a mathematical function of the dimensionless parameter provided by the quotient of two independent variables having common dimensions, comprising in combination, summing means responsive to first and second input quantities for providing a dividend quantity, means responsive to third and fourth input quantities for providing a divisor quantity, said first input quantity being commensurate with the product of the first variable and a first arbitrary coefficient, the second input quantity being commensurate with the product of the second variable and a second arbitrary coefficient, said third input quantity being commensurate with the product of said first variable and a third arbitrary coefficient, said fourth input quantity being commensurate with the product of the second variable and a fourth arbitrary coefficient, and dividing means responsive to said dividend quantity and said divisor quantity and operative to provide a quotient output quantity, said four arbitrary coefficients being selected with relative magnitudes such that said output quotient quantity is a function of said dimensionless parameter and, over the working range of the computer, the value of the algebraic sum affording the divisor of the quotient evaluated by said computer means does not approach zero.

2. An analogue computer for deriving a mathematical function of the dimensionless parameter provided by the quotient of two independent variables having common dimensions, and comprising means for deriving a first potential commensurate with the first variable factored by a first arbitrary coefficient, means for deriving a second potential commensurate with the second variable factored by a second arbitrary coefficient, means for deriving a third potential commensurate with the first variable factored by a third arbitrary coefficient, means for deriving a fourth potential commensurate with the second variable factored by a fourth arbitrary coefficient, means for algebraically summing the first and second potentials and the third and fourth potentials and for deriving therefrom an output quantity commensurate with the quotient of the algebraic sum of the first and second potentials and the algebraic sum of the third and fourth potentials, the arbitrary coefficients having relative magnitudes such that said output quantity is a function of said dimensionless parameter and, over the working range of the computer, the value of the algebraic sum affording the divisor of the quotient evaluated by the computer does not approach zero.

3. An analogue computer for deriving a mathematical function of the dimensionless parameter provided by the quotient of two independent variables having common dimensions, and comprising summing means for effecting algebraic summation of four input potentials to derive a fifth potential, a servo-motor responsive to said fifth potential as input for driving an output shaft to a position representing a quantity which constitutes the desired function of said dimensionless parameter, means for applying to the summing means as the first of the four inputs a potential commensurate with the first variable factored by a first arbitrary coefficient, means for applying to the summing means as the second input a potential commensurate with the second variable factored by a second arbitrary coefficient, means for modifying, in accordance with the quantity represented by the servo-motor shaft position, a quantity commensurate with the first variable factored by a third arbitrary coefficient to obtain a potential for application to the summing means as the third input, and means for modifying, in accordance with the quantity represented by the servo-motor shaft position, a quantity commensurate with the second variable factored by a fourth arbitrary coefficient to obtain a potential for application to the summing means as the fourth input.

4. An analogue computer according to claim 1, wherein the two variable are aerodynamic analogue quantities representing respectively airspeed and aircraft propeller rotational speed, and the output quantity derived is a function of the quotient of these variables employed in computing aircraft propeller thrust.

5. An analogue computer according to claim 4, and comprising means for deriving a quantity commensurate with the square of the airspeed variable factored by an analogue of air density, means for deriving a further quantity commensurate with the square of the aircraft propeller rotational speed variable factored by the air density analogue, means for algebraically summing said two quantities, and means for modifying the result of this summation in accordance with the aforesaid output quantity representing a function of the quotient of said variables to obtain a final quantity commensurate with aircraft propeller thrust.

6. Analog computer apparatus for providing an output quantity which is a function of the ratio between first and second independent variables, at least one of which is capable of becoming zero, said apparatus being capable of operating over a range including the zero value of said one of said variables to provide said output quantity, comprising in combination, first means for deriving first and third quantities each varying in accordance with said first independent variable and each of which is scaled in magnitude in accordance with a different arbitrary coefficient, second means for deriving second and fourth quantities each varying in accordance with said second independent variable and each of which is scaled in magnitude in accordance with a different arbitrary coefficient, a feedback control device for providing said output quantity, said feedback control device including a comparison means responsive to an input quantity and two feedback quantities and operative to provide an operating quantity, means for combining said first and second quantities to provide said input quantity, said feedback control device being operative to modify said third and fourth quantities in accordance with said output quantity to provide said feedback quantities, said operating quantity being connected to operate said feedback control device, whereby said output quantity is commensurate with the quotient of the sum of said first and second quantities divided by the sum of said third and fourth quantities.

7. An analog computer for providing an output quantity which is a function of the ratio $$\frac{x}{y}$$

of two independent variables $x$ and $y$, said computer being operative to provide said output quantity in quantitatively accurate manner as said $y$ independent variable approaches zero, comprising in combination; means for deriving first and second quantities which vary in accordance with $ax$ and $by$ respectively; means for deriving third and fourth quantities which vary in accordance with $cx$ and $dy$ respectively, wherein $a$, $b$, $c$ and $d$ are arbitrary constants and $c$ and $d$ are selected in relation to $x$ and $y$ so that the sum quantity $cx+dy$ does not become zero over the intended range of operation of said computer; and means responsive to said first, second, third and fourth quantities for providing said output quantity, said output quantity varying in accordance with $$\frac{ax+by}{cx+dy}$$

References Cited in the file of this patent
UNITED STATES PATENTS

| 2,656,977 | Cummings | Oct. 27, 1953 |
| 2,699,386 | Boghosian et al. | Feb. 16, 1954 |
| 2,784,501 | Stern et al. | Mar. 12, 1957 |